(12) United States Patent
Hoel et al.

(10) Patent No.: US 10,538,460 B2
(45) Date of Patent: Jan. 21, 2020

(54) CERAMIC SLURRIES FOR ADDITIVE MANUFACTURING TECHNIQUES

(71) Applicant: General Electric Company, Schenectady, NY (US)

(72) Inventors: Cathleen Ann Hoel, Schenectady, NY (US); Xi Yang, Alpha, OH (US); Michael Joseph O'Brien, Halfmoon, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/922,587

(22) Filed: Mar. 15, 2018

(65) Prior Publication Data

US 2019/0284096 A1    Sep. 19, 2019

(51) Int. Cl.
*C04B 35/10* (2006.01)
*C04B 35/48* (2006.01)
(Continued)

(52) U.S. Cl.
CPC .............. *C04B 35/10* (2013.01); *B28B 1/001* (2013.01); *C04B 35/14* (2013.01); *C04B 35/481* (2013.01); *C04B 35/632* (2013.01); *C04B 35/64* (2013.01); *B33Y 70/00* (2014.12); *C04B 2235/3201* (2013.01); *C04B 2235/3206* (2013.01); *C04B 2235/3208* (2013.01); *C04B 2235/3217* (2013.01); *C04B 2235/3225* (2013.01); *C04B 2235/3234* (2013.01);
(Continued)

(58) Field of Classification Search
CPC ......... C04B 35/10; C04B 35/14; C04B 35/64; C04B 35/632; C04B 35/481; C04B 2235/3244; C04B 2235/3234; C04B 2235/3225; C04B 2235/667; C04B 2235/3208; C04B 2235/3206; C04B 2235/3201; C04B 2235/5436; C04B 2235/483; C04B 2235/3418; C04B 2235/3275; B28B 1/001
See application file for complete search history.

(56) References Cited

U.S. PATENT DOCUMENTS 4,061,652 A    12/1977    Schroeter et al.
4,179,548 A    12/1979    Schroeter et al.
(Continued)

FOREIGN PATENT DOCUMENTS

WO    2015068860 A1    5/2016
WO    2016191534 A1    12/2016
(Continued)

OTHER PUBLICATIONS

U.S. Appl. No. 15/251,991, filed Aug. 30, 2016, Michael Joseph O'Brien.
(Continued)

*Primary Examiner* — Noah S Wiese
(74) *Attorney, Agent, or Firm* — General Electric Company; William Scott Andes (57) ABSTRACT

A ceramic slurry for forming a ceramic article includes a binder, a first plurality of ceramic particles having a first morphology, a second plurality of ceramic particles having a second morphology that is different from the first morphology; and a photoinitiator. A method for using this slurry for fabricating ceramic articles is presented as well.

22 Claims, 2 Drawing Sheets

(51) Int. Cl.
  *C04B 35/632* (2006.01)
  *C04B 35/64* (2006.01)
  *B28B 1/00* (2006.01)
  *C04B 35/14* (2006.01)
  *B33Y 70/00* (2015.01)

(52) U.S. Cl.
  CPC ............. *C04B 2235/3244* (2013.01); *C04B 2235/3275* (2013.01); *C04B 2235/3418* (2013.01); *C04B 2235/483* (2013.01); *C04B 2235/5436* (2013.01); *C04B 2235/667* (2013.01)

(56) References Cited

U.S. PATENT DOCUMENTS

| | | | |
|---|---|---|---|
| 5,488,017 | A | 1/1996 | Szweda et al. |
| 5,496,682 | A | 3/1996 | Quadir et al. |
| 5,601,674 | A | 2/1997 | Szweda et al. |
| 6,103,779 | A * | 8/2000 | Guzauskas ............ A61C 5/007 523/115 |
| 6,117,612 | A | 9/2000 | Halloran et al. |
| 6,814,926 | B2 | 11/2004 | Geving et al. |
| 7,265,161 | B2 | 9/2007 | Leatherdale et al. |
| 7,790,347 | B2 | 9/2010 | Leatherdale et al. |
| 7,854,969 | B2 | 12/2010 | Millard et al. |
| 7,927,538 | B2 | 4/2011 | Moszner et al. |
| 8,106,107 | B2 | 1/2012 | Napadensky |
| 8,133,831 | B2 | 3/2012 | Laubersheimer et al. |
| 8,240,383 | B2 * | 8/2012 | Xu ........................ C09K 8/805 166/278 |
| 8,475,946 | B1 | 7/2013 | Dion et al. |
| 8,851,152 | B2 | 10/2014 | Frasier et al. |
| 2008/0135721 | A1 | 6/2008 | Wang et al. |
| 2012/0010066 | A1 | 1/2012 | Fischer et al. |
| 2012/0015797 | A1 | 1/2012 | Schlienger et al. |
| 2013/0049241 | A1 * | 2/2013 | Tsujimoto .......... A61C 13/0022 264/19 |
| 2014/0141676 | A1 * | 5/2014 | Crandall .............. D04H 1/4291 442/347 |
| 2015/0306657 | A1 | 10/2015 | Frank |
| 2016/0107331 | A1 | 4/2016 | Schmidt |
| 2016/0221262 | A1 | 8/2016 | Das et al. |
| 2017/0346079 | A1 * | 11/2017 | Friend ................. H01M 4/364 |

FOREIGN PATENT DOCUMENTS

| | | |
|---|---|---|
| WO | 2017029673 A1 | 2/2017 |
| WO | 2017050983 A1 | 3/2017 |
| WO | 2017124065 A1 | 7/2017 |

OTHER PUBLICATIONS

Wu, Haihua, et al.; "Fabrication of integral ceramic mold for investment casting of hollow turbine blade based on stereolithography", Rapid Prototyping Journal, vol. 15, Issue: 4, pp. 232-237, 2009.

Tiwari, et al.; "Material Properties and Selection for Selective Laser Sintering Process", International Journal of Manufacturing Technology and Management, vol. 27, Issue: 4-6, pp. 198-217, 2013.

Greco, A. et al., Stereolitography of Ceramic Suspensions, Journal of Materials Science 36, 2001, pp. 99-105, Kluwer Academic Publishers.

International Searching Authority, International Search Report and Written Opinion issued in corresponding PCT Application No. PCT/US2019/020644 dated Jun. 19, 2019.

* cited by examiner

CERAMIC SLURRIES FOR ADDITIVE MANUFACTURING TECHNIQUES

BACKGROUND

The subject matter disclosed herein relates to light-curable ceramic slurries, and more specifically, to light-curable ceramic slurries suitable for additive manufacturing (3D printing) techniques.

Ceramic slurries can be used to manufacture ceramic parts such as refractory components for high temperature applications, fixturing/support structures and thermal insulation. Typical ceramic slurries generally include an organic binder, such as a light-curable organic resin, ceramic particles, and additives (e.g., dispersants, photoinitiators, and stabilizers, etc.). These formulations are common, for example, in the dental industry. Once a light-curable ceramic slurry has been formed and deposited, a suitable light source may supply the requisite activation energy to cure (i.e., polymerize) the organic binder, such that the ceramic particles are bound to one another by the polymerized binder, yielding what is referred to as a green (i.e., unfired) ceramic part of the desired shape. Once cured, the green ceramic part may be partially fired, that is, heated to a temperature less than the sintering temperature of the ceramic particles, to release organics (e.g., debind) from the green ceramic part, yielding what is referred to as a brown ceramic part. Subsequently, the brown ceramic part is completely fired ("sintered") such that the ceramic particles fuse into the final ceramic article.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In one embodiment, a ceramic slurry for forming a ceramic article includes a binder, a first plurality of ceramic particles having a first morphology, a second plurality of ceramic particles having a second morphology that is different from the first morphology, and a photoinitiator.

In a second embodiment a method for fabricating an article includes depositing the slurry composition described above onto a working surface; curing at least a portion of the slurry composition to form a green ceramic material; debinding the green ceramic material to form a brown ceramic material; and sintering the brown ceramic material to form a final ceramic article.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As used herein, a "working surface" is intended to denote a surface onto which a ceramic slurry may be deposited during additive manufacturing processes. The working surface may include a working platform of a 3D printer or a printed ceramic layer. As used herein, a "binder" denotes at least one material that binds the ceramic particles together in the unfired state. As used herein, the term "morphology" when used in the context of particle characteristics refers to the shape of the particle. As used herein, "sphericity" denotes a ratio of the surface area of a sphere having the same volume as the particle to the surface area of a particle, where a perfectly spherical particle would have a sphericity of 1. A particle having a high sphericity has a morphology similar to the morphology of a spherical particle, and a particle having a low sphericity has a morphology that is less spherical and more angular. That is, the sphericity of a particle refers to how close a shape of a particle is to a perfect sphere. As used herein, a "photoinitiator" denotes a compound that has a catalytic effect on a curing reaction of a binder upon exposure to electromagnetic radiation having a wavelength within a corresponding photoactivation wavelength range.

There are numerous techniques for manufacturing articles, such as metal and ceramic articles used in a variety of applications. For example, molding techniques, such as slip casting, freeze-casting, and/or injection molding, among others, may be used to manufacture ceramic parts for refractory applications. To form porous ceramic bodies suitable for use in, for instance, refractory supports and fixtures, ceramic molds and cores, sensor components, high temperature filters, and other applications, a ceramic slurry may be made from large coarse particles (e.g., particles having a median particle size ($d_{50}$) between 30 microns (μm) and 60 μm) to mitigate shrinkage and densification of the ceramic particles during firing to generate the ceramic article.

Manufacturing custom-designed ceramic articles or other refractory components via conventional molding techniques typically increases cost. Additionally, certain designs cannot be made with traditional tooling. For example, certain ceramic articles may be manufactured using a mold, as in injection molding and other molding processes. Using the mold incurs manufacturing time and cost due, in part, to preparation and processing steps associated with generating and removing the mold. Additionally, the molds may contain residues that may transfer onto surfaces of the ceramic article and affect the overall quality of the ceramic article. Moreover, shapes with a high degree of complexity may be very difficult or even impossible to form using traditional molds. For these reasons, the use of additive manufacturing techniques (also referred to herein as 3D printing) to fabricate ceramic parts may be advantageous in many instances. By way of non-limiting example, additive manufacturing techniques that may be used to manufacture ceramic articles include digital light processing (DLP), stereolithography (SLA), binder jet deposition, ink jet deposition, or any other suitable additive manufacturing modality. Additive manufacturing techniques can provide the ability to manufacture complex ceramic articles without the use of molds, while also decreasing manufacturing costs due, in part, to the use of less material (e.g., no metal die and molds are used and less ceramic slurry is used) and to the short processing times associated with 3D printing. Moreover, additive manufacturing techniques can allow for fabrication of ceramic articles having complex geometries and intricacies beyond the limits of other manufacturing techniques (e.g., molding techniques).

In additive manufacturing techniques, a layer, typically microns to millimeters thick, of a ceramic slurry having a binder (such as a light-curable binder) is deposited onto a working surface. Once the layer of slurry has been deposited, it may be cured, that is, solidified, such as by heating, by reacting with moisture in the ambient environment, or by irradiating with electromagnetic radiation having a suitable wavelength (e.g., ultraviolet, visible) to initiate polymerization of the binder. All or only selected portions of the layer may be subjected to curing to form a layer of a "green" (unfired) ceramic material. Subsequently, another layer of the slurry is deposited over the previous layer of the green ceramic, the new layer is selectively cured, and the layer-by-layer process is repeated until the desired structure of a green ceramic article is achieved. The green ceramic article may be partially fired to achieve a "brown" ceramic article, and then fully fired (e.g., sintered) to achieve the final ceramic article.

Additive manufacturing of refractory components typically deposits layers of the ceramic slurry that are approximately 25 μm thick. Accordingly, ceramic slurries used in additive manufacturing applications are generally made from fine ceramic particles having a $d_{50}$ that is less than 25 μm. For example, ceramic slurries may include ceramic particles having a $d_{50}$ between approximately 1 μm and 25 μm. However, the use of fine ceramic particles generally increases the viscosity of a ceramic slurry relative to slurry formed using larger particles. If the viscosity of the ceramic slurry is too high, the slurry may be unsuitable for processing by typical additive manufacturing techniques. One approach to decrease slurry viscosity is to increase the particle size of the ceramic particles in the slurry, but the effectiveness of this strategy is limited in additive manufacturing techniques due to the constraints noted above for the size of the particles. As such, it is recognized that it is challenging to design a ceramic slurry formulation that is suitable for 3D printing.

Moreover, ceramic slurries made from fine ceramic particles having a single/uniform morphology and a $d_{50}$ less than 25 μm (e.g., between approximately 1 μm and 25 μm) also can be undesirable for additive manufacturing applications. For example, ceramic articles manufactured from a ceramic slurry made from fine ceramic particles that have a single morphology, that is, ceramic particles having a uniformly high sphericity may result in undesirable shrinkage and densification of the ceramic article after firing. As such, the porosity, that is, the volumetric concentration of pores, of the ceramic article may not be suitable for the desired application in which the ceramic article is to be used. Additionally, densification resulting from undue shrinkage may increase a working strength, thermal conductivity, weight, or other properties of the ceramic article such that the ceramic article may be unsuitable for its intended use. As discussed above, certain ceramic slurries used to manufacture ceramic articles using non-additive manufacturing techniques may include coarse ceramic particles having a $d_{50}$ greater than 25 μm (e.g., between approximately 30 μm and 60 μm) to mitigate densification of the ceramic article after sintering. Therefore, there is a need to develop ceramic slurries suitable for use in 3D printing of ceramic articles that do not result in shrinkage and densification of the ceramic articles during post printing processes.

With the foregoing in mind, the present inventors have recognized certain ceramic slurries that include mixtures of fine ceramic particles having different morphologies, rather than ceramic particles having a uniform morphology, are well-suited for 3D printing of ceramic articles. As such, present embodiments are directed towards ceramic slurries that include a mixture of fine ceramic particles having different morphologies, such as, for instance, a mixture of classes of particles where one class has a relatively high sphericity (such as nominally spherical particles, for example), and a second class of particles has a relatively low sphericity (such as particles having a more of a faceted or angular morphology, for example). As discussed below, the disclosed ceramic slurry formulations can reduce sintering shrinkage and densification of the printed ceramic article compared to conventional ceramic slurry formulations. Additionally, as discussed in further detail below, the different particle morphologies within the disclosed ceramic slurry formulations provide slurry viscosities suitable for 3D printing. For example, within the disclosed ceramic slurry formulations, round, sphere-like fine ceramic particles can more easily slip past each other within a flowing slurry, decreasing slurry viscosity compared to other ceramic slurries having only fine ceramic particles with substantially uniform low-sphericity morphology.

Accordingly, among the embodiments of the present invention disclosed herein are ceramic slurry formulations that include a mixture of fine ceramic particles (e.g., having a $d_{50}$ that is less than approximately 25 μm) having different morphologies (such as, e.g., rounded and angular), wherein the slurry formulations are suitable for additive manufacturing of porous ceramic articles such as refractory supports and fixtures, ceramic molds and cores, sensor components, high temperature filters, etc. As discussed in further detail below, some embodiments of the disclosed ceramic slurry formulations include mixtures of at least two classes of fine ceramic particles, where the classes have different particle sphericities. The term "round" as used herein, refers to the class of ceramic particles having a comparatively high sphericity. The term "angular" as used herein, refers to fine ceramic particles having a lower sphericity than the "round" class of particles. Additionally, as discussed below, ceramic articles that are 3D printed using the disclosed ceramic slurry formulations have desirable densities and porosities after firing (e.g., sintering).

One embodiment is a ceramic slurry that includes a binder, a first plurality of ceramic particles, a second plurality of ceramic particles, and a photoinitiator. The slurry further may include solvents, photosensitizers, dispersants, stabilizers, antifoam agents, wetting agents, release agents and so forth, in accordance with the present disclosure. It may be appreciated that the ingredients may be mixed in different orders. For example, in certain embodiments, the resin may be added first, and then the additives may be added to form a light-curable binder. Following formation of the light-curable binder, the mixture of the fine ceramic particles may be added to form the ceramic slurry. In certain embodiments, the ceramic slurry may be mechanically mixed, mixed by hand, acoustic waves or a combination thereof, to achieve the desired consistency.

The particles of the first plurality have a first morphology, and the particles of the second plurality have a second morphology that is different from the first morphology. In certain embodiments, this difference between particle morphologies of the respective particle pluralities is characterized by a difference in the degree to which the particles approach perfect sphere shapes; as noted previously, the mathematical quantity, sphericity, is used in the art to quantify this characteristic. For the purposes of this disclosure, the sphericity of a plurality of particles refers to the median sphericity measured for a representative sample of particles. Thus, in such embodiments, the first plurality of particles has a first sphericity and the second plurality of particles has a sphericity that is less than the sphericity of the first plurality. In physical terms, the first plurality of particles is more "sphere-like" than the particles of the second plurality. These more sphere-like particles may help to maintain sufficiently low slurry viscosity for efficient flow in additive manufacturing processes. In some embodiments, the sphericity of the particles of the first plurality is at least 0.9. The particles of the second plurality are less spherical, and in some cases exhibit faceted or angular morphology; particles of such shape tend to reduce the propensity of the ceramic material of the slurry to densify during firing, preserving a desirable level of porosity in the final article. In some embodiments, the sphericity of the particles of the second plurality is less than 0.9, such as less than 0.85 and, in some cases, less than 0.8.

Other parameters are commonly applied in the art of particle shape characterization, and thus it will be apparent that in addition to, or in place of, sphericity, other parameters such as roundness (ratio of the average radius of curvature of the edges or corners to the radius of curvature of the maximum inscribed sphere) and aspect ratio (ratio of longest projection to smallest projection) may be used to differentiate the first plurality from the second plurality. Generally, particles of the first plurality have a higher roundness than particles of the second plurality, and an aspect ratio closer to 1. These characteristics are indicative of the particles of the first plurality being closer to sphere-shaped than the particles of the second plurality. Ceramic powders used in the art are routinely synthesized, milled, sieved, and/or otherwise processed to provide desired morphology and size distribution. Those skilled in the art will appreciate that vendors in the industry can readily supply particles having morphological characteristics, such as sphericity, that are specified by a purchaser.

The mixture of particle morphologies in the ceramic slurry promotes a viscosity that may be suitably low for additive manufacturing. For example, the round morphology of the round fine ceramic particles is believed to allow the round fine ceramic particles to easily slip past other fine ceramic particles in the ceramic slurry. However, round, fine ceramic particles, when used alone in the slurry, may slip and rearrange into a more tightly packed structure during debind and sintering, resulting in undue levels of shrinkage and densification. To mitigate this effect, the disclosed ceramic slurry also includes the less-spherical ceramic particles that are less prone to slip and rearrange during debind and sintering as a result of their different morphology. For example, angular particles may create and preserve voids (e.g., gaps, spaces) between the more spherical ceramic particles in the printed ceramic article. The voids thus created may decrease the particle packing of the ceramic particles, and consequently decrease shrinkage and densification of the 3D printed ceramic article during sintering. Therefore, by using the disclosed mixture of the high and low sphericity ceramic particles in the ceramic slurry, shrinkage and densification of the printed ceramic article may be decreased compared to ceramic articles made using ceramic slurries that lack the disclosed mixture of ceramic particles. As such, the disclosed 3D printed ceramic articles generally have desirable densities and porosities for their intended applications.

The binder (which term is intended to include precursor materials that ultimately form a binder during subsequent processing) allows the ceramic particles to adhere to one another after deposition onto the working surface, thereby forming a green ceramic article. An example of a binder includes an organic resin, which typically includes one or more organic compounds that are convertible to polymers. In certain embodiments, the binder includes a mixture of mono-, di- and/or multi-functional acrylates and/or methacrylates that are capable of curing via a free radical mechanism. These acrylates and methacrylates may be monomeric, oligomeric or polymeric in nature. Examples of materials that may be used in formation of the binder include tricyclodecane dimethanol diacrylate, bisphenol A ethoxylate diacrylate, isobornyl acrylate, isobornyl methacrylate, diurethane dimethacrylate, trimethylolpropane ethoxylate triacrylate, acrylated polyurethane, and acrylated polyester. Optionally, multi-functional thiols capable of reacting with the acrylates and methacrylates via the thiol-ene reaction may be added as well. Examples include trimethylolpropane tris(2-mercaptoacetate) and trimethylolpropane tris(3-mercaptopropionate).

In another embodiment the binder contains cationically curable monomers such as epoxies, oxetanes, and/or vinyl ethers. Examples of such monomers include 3,4-epoxycyclohexylmethyl 3,4-epoxycyclohexane-carboxylate, hydrogenated bisphenol A diglycidyl ether oligomer, 3-ethyl-3-oxetanemethanol, and 1,4-cyclohexane dimethanol divinyl ether. Optionally, polyols such as poly(tetrahydrofuran) and/or polycaprolactonetriol may also be included.

In certain embodiments, the slurry disclosed herein includes a hybrid binder. The term "hybrid binder," as used herein, refers to a binder that includes an organic resin mixed with a reactive siloxane. In a light-cured slurry system, for instance, the organic resin component and the reactive siloxane component polymerize when the photoinitiator of the ceramic slurry is exposed to light in the photoactivation wavelength range, such as ultraviolet light in a so-called "UV-cured" formulation. The reactive siloxane component may include a multi-functional, short (e.g., between approximately 3 and approximately 8 siloxane (Si—O) units), cyclic siloxane, or a multi-functional, longer, straight-chain silicone polymer, capable of copolymerizing with the organic resin component. For example, in certain embodiments, the reactive siloxane may include 2, 3, 4, 5, 6, 7, 8, or more functional groups (e.g., vinyl groups) capable of polymerizing (e.g., copolymerizing or homopolymerizing) under the curing conditions. The reactive siloxane component of the disclosed hybrid binder may include one or more of: tetravinyltetramethyl cyclotetrasiloxane ($D_4^{Vi}$), tetrakis(vinyldimethylsiloxy)silane ($M_4^{Vi}Q$), vinylmethoxysiloxane homopolymer (ViOMe, available as part number VMM-010 from Gelest of Morrisville, Pa.), vinylmethylsiloxane cyclics ($D_x^{Vi}$ cyclics, available as part number VMS-005 from Gelest), mixed linear and cyclic siloxanes from the hydrolysis of mercaptopropylmethyldimethoxysilane ($D_x'$), and methacrylate functional silicone resins. While the organic resin portion of the hybrid binder decomposes and volatilizes during partial firing, the siloxane portion is converted to silica that is disposed about (e.g., between, around) the mixture of the ceramic particles to enhance the handling strength of the brown ceramic part relative to similar parts made with non-hybrid binders (e.g., containing organic resin alone). The hybrid binder-derived silica reacts with alumina particles to form aluminosilicate (e.g., mullite), thereby reducing alumina densification and sintering shrinkage.

In embodiments in which the slurry formulation is curable by exposure to electromagnetic radiation, the disclosed slurry generally includes at least one photoinitiator. The photoinitiator may include any suitable structure capable of absorbing light (e.g., UV, visible light) emitted by the activation energy source and, in response, promoting curing of the binder. For example, in certain embodiments, the photoinitiator may be or include: 2-hydroxy-2-methylpropiophenone (HMPP); phenyl bis(2,4,6-trimethylbenzoyl) phosphine oxide (PBTMBPO) (e.g., IRGACURE® 819); 2-hydroxy-2-methyl-1-phenyl-1-propanone (e.g., Darocur® 1173); diphenyl (2,4,6-trimethylbenzoyl) phosphine oxide (e.g., Darocur® TPO); or 1-hydroxycyclohexyl phenyl ketone (e.g., IRGACURE® 184) or other suitable photoinitiators. In certain embodiments, a photosensitizer and/or photoacid generator may be used in conjunction with the photoinitiator to facilitate curing of the slurry. For example, in certain embodiments, the slurry may include 4-benzoyl-4'methyl-diphenyl sulfide, isopropylthioxanthone, or 9,10-diethoxyanthracene as a photosensitizer. In certain embodiments, the slurry may include one or more diaryliodonium and triarylsulfonium salts, such as, (p-methylphenyl)iodonium tetrakis(pentafluorophenyl) borate, or sulfonium salts UVI-6976 or UVI-6990 (available from Dow Chemical, Midland, Mich., U.S.A.) as a photoacid generator. In certain embodiments, the light-curable ceramic slurry may include one or more of Omnicat 432 and 550 (available from IGM Resins, Waalwijk, The Netherlands), PAG 290 (available from BASF), SL-6992 (available from Esstech, Inc., Essington, Pa., U.S.A.), or iodonium salts IRGACURE® 250 (available from BASF), Omnicat 440 (available from IGM Resins), or UV9380C (Momentive Performance Materials, Waterford, N.Y., U.S.A.) as a photoacid generator.

The slurries may contain optional additives such as dispersants, dyes and stabilizers. Typical materials that serve these functions and their corresponding concentrations will be readily known or discernable by practitioners in the art. In some embodiments, a dispersant may be used to alter the viscosity of the ceramic slurry. A dispersant is any chemical or mixture of chemicals that can alter the rheological properties of a slurry when added in small proportions, typically less than 5 wt % of the entire slurry. The dispersant choice will depend on the properties of the ceramic particle surfaces and binder as well as the desired viscosity at certain shear rates and rheological behavior. Without limitation, examples of dispersants include Triton™ X-100 (Dow Chemical Company), Variquat® products (Evonik Industries), Jeffamine® (Huntsman), oleyl amine, oleic acid, stearic acid, Hypermer™ KD products (Croda), and Silwet™ (Momentive Performance Materials Inc.).

The ceramic particles are generally mixed with the binder to form a slurry, such as a light-curable ceramic slurry. In certain embodiments, a total particle loading of the ceramic particles in the slurry, that is, including particles of the first and second pluralities, is in a range from about 45% to about 75% by volume of the slurry. The first and second plurality ceramic particles may each be loaded in any suitable relative proportion. For example, in certain embodiments, the slurry comprises from about 20% to about 99% ceramic particles of the first plurality and from about 1% to about 80% ceramic particles of the second plurality, where these relative proportions are represented as percentages by volume of the total ceramic addition present in the slurry. Examples of relative volume ratios of first plurality particles to second plurality particles include, without limitation, 90:10, 85:15, 75:25, 60:40, 50:50, 40:60, and 30:70; selection of the relative ratio will depend on a number of factors, including, among others, the desired viscosity of the slurry, green strength of the cured article, and porosity of the finished article. In certain embodiments, the volume ratio of first plurality particles to second plurality particles is at least 1.5 (that is, at least 3 parts by volume of the first plurality particles to 2 parts second plurality particle volume); having a comparatively high level of more spherical particles may help maintain slurry viscosity in a range useful for certain additive manufacturing techniques. The ceramic particles used for first plurality and second plurality may independently include one or more of any suitable ceramic materials, typically, though not necessarily, oxide materials, examples including, but not limited to, silica, alumina, zircon, zirconia, titanium oxide, sodium carbonates, calcium oxide, boron sesquioxide, yttrium oxide, yttrium aluminate, magnesium oxide, magnesium aluminate, calcium carbonate, iron oxide, ground glasses, cobalt oxide, sodium oxide, erbia and any combination including one or more of these.

As discussed above, ceramic slurries used in additive manufacturing of ceramic parts are generally made from ceramic particles having a median particle size distribution ($d_{50}$) less than 25 μm. For example, the ceramic particles may have a $d_{50}$ that is approximately 1 μm to 25 μm, such as between approximately 1 μm and 25 μm, approximately 2 μm and 25 μm, approximately 5 μm and 15 μm, or approximately 10 μm and 15 μm.

Slurry properties may be affected in some cases not only by the relative concentration levels of the first and second plurality of particles, but also by their size. In particular, size differences between the two classes of particle morphologies may be manipulated to arrive at desired slurry characteristics. Therefore, in certain embodiments, the ceramic particles of the first plurality may have a different $d_{50}$ value from the ceramic particles of the second plurality; in particular embodiments, the $d_{50}$ of the first plurality of particles is greater than that of the second plurality of particles. For example, in certain embodiments, the first plurality of ceramic particles has a $d_{50}$ in a range from about 8 μm to about 15 µm, and the second plurality of ceramic particles has a $d_{50}$ in a range from about 2 µm to about 8 µm. The efficacy with which the particles of the second plurality inhibit undue shrinkage and/or densification may be enhanced in some cases by having these particles relatively smaller than the particles of the first plurality, as for instance the particles having a less spherical morphology may be more readily situated between the larger, more spherical particles to maintain dimensional stability during consolidation. In alternative embodiments, the $d_{50}$ of the less spherical particles is greater than that of the more spherical particles; experiments have demonstrated that this composition may also result in desirable levels of porosity in processed articles. For example, in certain embodiments, the first plurality of ceramic particles has a $d_{50}$ in a range from about 4 µm to about 10 µm, and the second plurality of ceramic particles has a $d_{50}$ in a range from about 8 µm to about 15 µm, with the $d_{50}$ of the particles of the second plurality being larger than that of the first plurality.

Example 1, set forth below, describes a ceramic slurry that may be used for fabricating a porous ceramic part using 3D printing techniques.

Example 1

A light-curable resin blend was prepared by mixing the following: 46 parts ethoxylated trimethylolpropane triacrylate and 20 parts tricyclodecane dimethanol diacrylate. The light-curable resin blend also included 34 parts diurethane dimethyacrylate and 0.1 parts t-butyl catechol (stabilizer), and 2 parts of bis(2,4,6,-trimethylbenzoyl)-phenylphosphine oxide (photoinitator). The light-curable resin binder was loaded with approximately 53% by volume of ceramic particles with the following alumina powder composition: (1) approximately 75% alumina particles having a relatively high sphericity and a $d_{50}$ of approximately 12 µm and (2) approximately 25% of alumina particles having a lower sphericity relative to the particles of (1) and a $d_{50}$ of approximately 6 µm. Yttria ($Y_2O_3$) was also added to the binder such that the entire quantity of ceramic powder added to the slurry was composed of 94 wt. % alumina and 6 wt % yttria; the yttria was included in part to decrease propensity to creep in the sintered ceramic part at elevated temperatures (e.g., temperatures above 1200 degree Celsius (° C.)).

Figure 1:
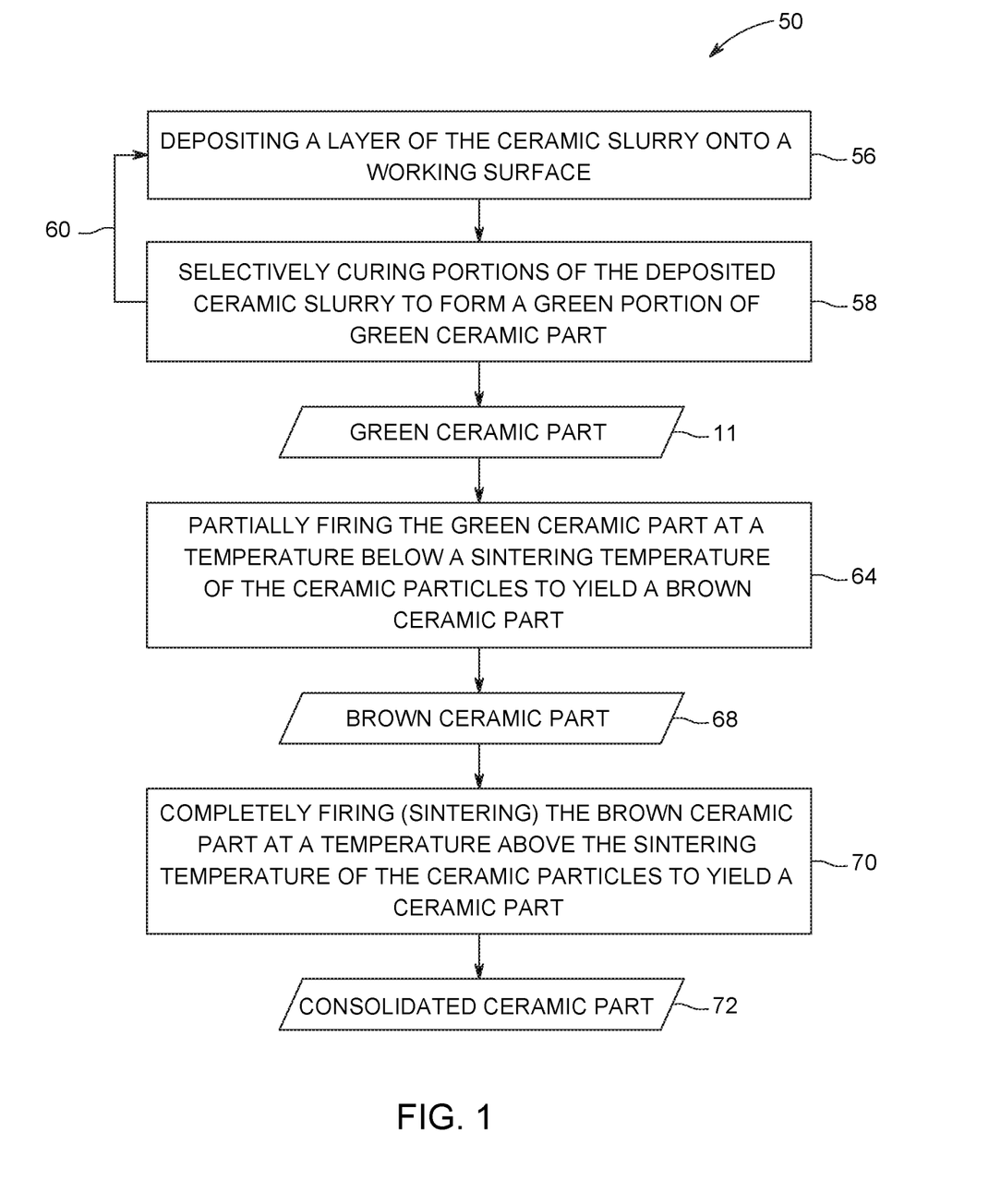
FIG. 1 is a flow diagram of a process for manufacturing the ceramic part, in accordance with embodiments of the present approach.

Another embodiment of the present invention includes a method for forming a ceramic article using the slurry composition described herein. The illustrated process 50 includes depositing (block 56) a layer of the ceramic slurry onto a working surface. As set forth above, in certain embodiments, the layer of the ceramic slurry may be deposited on a working platform of a 3D printer or on top of a previously cured layer of the part being formed. The deposited slurry layer may range in thickness from a few microns to several millimeters. In certain embodiments, the thickness of the deposited slurry layer may be less than the penetration depth of the light source used to cure the light-curable ceramic slurry to ensure that the entire layer completely cures upon irradiation, such as by a curing unit associated with the 3D printer.

The illustrated process 50 continues with curing (block 58) portions of the deposited layer of the light-curable ceramic slurry with a light source suitable to cure the light-curable ceramic slurry to yield a portion of a green ceramic article 11. For example, the curing unit may include a light source (e.g., laser, lamp, LED) that is capable of selectively providing electromagnetic activation energy that initiates polymerization of the binder in the ceramic slurry, resulting in curing of the binder and formation of the cured layer of the green ceramic article 11. As indicated by the arrow 60, the steps represented by blocks 56 and 58 may be repeatedly performed to build up an entire green ceramic article 11 in a layer-by-layer manner. In certain embodiments, a solvent may be applied to the green ceramic article 11 (e.g., between layer deposition, after printing of the green ceramic article 11 is complete) to remove any uncured slurry from the cured portions of the green ceramic article 11.

The illustrated process 50 continues with partially firing (debinding) (block 64) the green ceramic article 11 at a temperature below the sintering temperature of the round and angular fine ceramic particles to remove the binder, create handling strength, and yield a brown ceramic article 68. It may be appreciated that the temperature of the partial firing step of block 64 should be sufficiently high (e.g., greater than approximately 500° C., between approximately 500° C. and approximately 1000° C., between approximately 500° C. and approximately 1200° C.) to ensure that the binder decomposes and is released from the green ceramic article 11. The rate at which the temperature is raised during this partial firing step is generally selected to ensure that the decomposition of the binder and the release of the decomposition products does not happen so rapidly as to damage the article. The specific rate selected, and the duration of this step, will depend in part on the composition of the binder and the volume of slurry being fired (i.e., the dimensions of the part); such considerations will be familiar to practitioners in the art. The duration of this partial firing step may be on the order of days for some parts. By specific example, in certain embodiments, the green ceramic article 11 may first be heated to a maximum temperature (e.g., 1200° C.) at a slow ramp over the course of 2 days, and then held at the maximum temperature for approximately 30 minutes.

It may be appreciated that, while the temperature of the partial firing (debinding) of block 64 is generally below the sintering temperature of the particular ceramic particles used to manufacture a green ceramic article 11, in certain embodiments, a limited amount of sintering may occur during this partial firing step, which may further increase the strength of the brown ceramic article 68. However, it may be appreciated that the limited sintering occurring in the partial firing temperature range represents only a small amount of fusion between the ceramic particle surfaces. As such, the limited amount of sintering that occurs during the partial firing step may contribute to the observed improvement in handling strength of the brown ceramic article 68, in certain embodiments. The green ceramic article 11 generally experiences shrinkage (i.e., debind shrinkage) during the partial firing step of block 64 and, in general, less debind shrinkage is generally beneficial to the quality and yield of the final ceramic part.

The illustrated process 50 continues with completely firing (sintering) (block 70) the brown ceramic article 68 at a temperature at or above the sintering temperature of the ceramic particles to yield the final ceramic article. During this sintering step, the brown ceramic article 68 is heated to a temperature in which the ceramic particles fuse into a substantially continuous porous ceramic article. For example, the brown ceramic article 68 is generally exposed to a source of energy that heats the brown ceramic article 68 and consolidates the mixed morphology ceramic particles of the printed layers of the brown ceramic article 68 to form a final consolidated ceramic article 72 having a porosity that is less than or equal to the porosity of the brown ceramic article 68. Sintering imparts strength and integrity to the brown ceramic article 68, such that the consolidated ceramic article 72 is suitable for use in its intended application. In certain embodiments, the complete firing of block 70 may involve heating to temperatures of at least approximately 1500° C. (such as, for instance, between approximately 1500° C. and 1900° C.) for an appropriate length of time, such as, for instance, between approximately 2 and 24 hours. Those versed in the art will appreciate that it may be advisable to adjust the temperature and time at temperature depending on, for instance, the specific type of material and conditions required for the final use of the article.

The brown ceramic article 68 generally experiences shrinkage during the complete firing step of block 70 and, for porous articles, less shrinkage is generally beneficial to the quality and yield of the consolidated ceramic article 72. As noted previously, by using the ceramic slurry disclosed herein, which includes a mixture of ceramic particles having different morphologies and/or sizes, shrinkage of the ceramic article may be mitigated to provide a ceramic article having a density, strength, and porosity suitable for use in porous refractory articles. For example, in certain embodiments, the use of the presently described ceramic slurry may enable reduced shrinkage (e.g., less than 3%) after sintering the brown ceramic article 68. By way of non-limiting example, the average net shrinkage of the brown ceramic article 68 after sintering may be between approximately 0.25% and 3% such that the final ceramic article has a porosity that is between approximately 25% and 45%. This level of porosity is comparable to ceramic article generated from ceramic slurries made from large coarse ceramic particles (e.g., having a $d_{50}$ between approximately 25 μm and 50 μm).

A cured sample of the light-curable ceramic slurry of Example 1 above was cut into multiple bars to measure debind and sintering shrinkage. The cured sample of the light-curable slurry of Example 1 was prepared by casting the light-curable slurry into a 5 centimeter (cm)×5 cm square with a doctor blade and cured with an ultraviolet (UV) lamp for 10 seconds. Five (5) to ten (10) layers of the light-curable slurry were subsequently cast and cured to form a ceramic plate having a thickness of between approximately 1.0 and 1.5 cm. The cured ceramic plate was cut into bars having a width of approximately 18 millimeters (mm) and a thickness of approximately 2 mm. The bars were partially fired at 1200° C. for thirty (30) minutes. The debind shrinkage was measured, followed by sintering at 1600° C. for three (3) hours, after which the sintering shrinkage was measured.

Example 2

A light-curable resin blend was prepared by mixing the following: 35 parts ethoxylated trimethylolpropane triacrylate, 30 parts isobornyl acrylate, 35 parts diurethane dimethacrylate, 0.05 parts t-butyl catechol, 0.25 parts bis(2,4,6,-trimethylbenzoyl)-phenylphosphine oxide, and 0.25 parts 1-hydroxycyclohexyl-1phenyl methanone. The light-curable resin was loaded with approximately 53% by volume of slurry with the following alumina powder formulation: approximately 25% fused alumina powder having a $d_{50}$ of approximately 57 μm, approximately 27% fused alumina powder having a $d_{50}$ of approximately 26 μm, approximately 2% of fused alumina powder having a $d_{50}$ of approximately 14 μm, approximately 36% of fused alumina powder having a $d_{50}$ of approximately 7 μm, and approximately 10% of fused alumina powder having a $d_{50}$ of approximately 6 μm. The ceramic powder was composed of 89.9 weight (wt) % of the alumina powder formulation, approximately 1.8 weight (wt) % magnesium oxide (MgO) to act as a grain growth inhibiting agent, and approximately 9.3 wt % yttria ($Y_2O_3$) to reduce creep at high temperatures (e.g., temperatures above 1200 degree ° C.). Notably, the alumina particles used in this formulation had generally the same morphology across all size classes, and a $d_{50}$ of greater than 25 microns. Test bars were formed using this slurry in a similar manner as described above for bars made using the slurry composition of Example 1.

Example 3

The debind shrinkage and sintering shrinkage of the bars formed from the two slurry formulations were compared. As indicated in Table 1 below, the average net shrinkage (e.g., debind and sintering shrinkage) of ceramic bars fabricated from the light-curable ceramic slurry of Example 1, which included a mixture of particle morphologies and a finer particle size than the Example 2 formulation, is similar to the average net shrinkage of ceramic bars fabricated from the conventional light-curable slurry of Example 2, which included coarse ceramic particles having a $d_{50}$ of greater than 25 μm. Accordingly, light-curable ceramic slurries having ceramic particles with a $d_{50}$ less than approximately 25 μm and mixed particle morphology mitigated shrinkage and densification during processing of the finished product.

TABLE 1

Average debind, sintering, and average net shrinkage for ceramic bars fabricated from light-curable ceramic slurries in Examples 1 and 2.

| Slurry Formulation | $D_{50}$ of largest ceramic particles (μm) | Average Debind Shrinkage (%) | Average Sintering Shrinkage (%) | Average Net Shrinkage (%) |
|---|---|---|---|---|
| Example 1 | 12 | 1.16 | 1.32 | 2.48 |
| Example 2 | 57 | 1.98 | 0.79 | 2.77 |

In other experiments, the average shrinkage of specimens that were 3D printed using ceramic slurries that include ceramic particles having a comparatively more spherical morphology, or ceramic particles having a comparatively more angular morphology, or different mixtures thereof were evaluated. Ceramic specimens fabricated with a ceramic slurry having 100% of the more spherical ceramic particles and no angular ceramic particles had a debind shrinkage after partial firing that is approximately 3 times more than the other represented ceramic slurries. Additionally, ceramic articles printed with a ceramic slurry having 100% of the more angular ceramic particles and none of the more spherical ceramic particles had a higher average shrinkage after partial firing and sintering than the other represented ceramic slurries; moreover, the slurry having this composition had a high viscosity and thus was not well-suited for 3D printing. In contrast, ceramic slurries having mixtures of lower sphericity ceramic particles and higher sphericity ceramic particles, including, for instance, mixtures having respective volume ratios of 1:1 and 3:1 of the more spherical particles to less spherical particles, demonstrated suitable viscosity for 3D printing and generated specimens having desirably low debind shrinkage and sintering shrinkage. The specimens fabricated from the slurries containing mixed morphology ceramic particles demonstrated between about 20% to about 50% less average shrinkage after partial firing and sintering than specimens fabricated from slurries having solely one particle morphology type. As a non-limiting example, an average sintering shrinkage of the ceramic part may be between approximately 0.1% and 1.5% after sintering when processed in accordance with some embodiments described herein.

In certain embodiments, the slurry further comprises a dopant, that is, an additive to the slurry that modifies the properties of the ceramic material constituting the finished product. For example, the dopant may be added to the ceramic slurry at a level of less than approximately 10 volume percent (vol %) of the ceramic slurry to achieve desired mechanical properties, such as creep resistance, in the ceramic article. In some embodiments, the dopant includes an inert compound added to the ceramic slurry. By way of non-limiting example, the dopant may include zirconia, titanium oxide, yttria, or another suitable oxide. In certain embodiments, zirconia doping may be used where the main ceramic constituent of the slurry is alumina ceramic particles; in other embodiments, titanium oxide doping may be used where the main ceramic constituent of the slurry is silica ceramic particles. Alternatively, the dopant may react with the ceramic particles of the first plurality and/or second plurality in the ceramic slurry to form a solid solution or new phase. For example, yttria doping in an alumina slurry matrix may form yttrium-aluminate during processing, and magnesium oxide doping of alumina may form magnesium aluminate during processing. The dopant may be added as an oxide or a precursor that forms an oxide when heated to debinding or sintering temperatures. Examples of dopants that may be suitable for use in the ceramic slurry, or present in the consolidated ceramic part, include but are not limited to yttrium oxide, yttrium aluminate, silica, silicon aluminate, magnesium silicate, magnesium aluminate, sodium silicate, sodium aluminate, calcium silicate, calcium aluminate, calcium oxide, magnesium oxide, sodium oxide, alumina, zirconia, yttrium stabilized zirconia and titanium oxide.

As discussed above, in certain embodiments, the ceramic slurry may include a hybrid binder. As mentioned, during debinding, the hybrid binder may at least partially decompose into silica, which can enhance the handling strength of the brown ceramic article 68 after debinding (block 64 of FIG. 1), promote reaction bonding to mitigate shrinkage during sintering for certain types of ceramic particles (e.g., alumina via aluminosilicate formation), and improve creep resistance in the final ceramic article.

Figure 2:
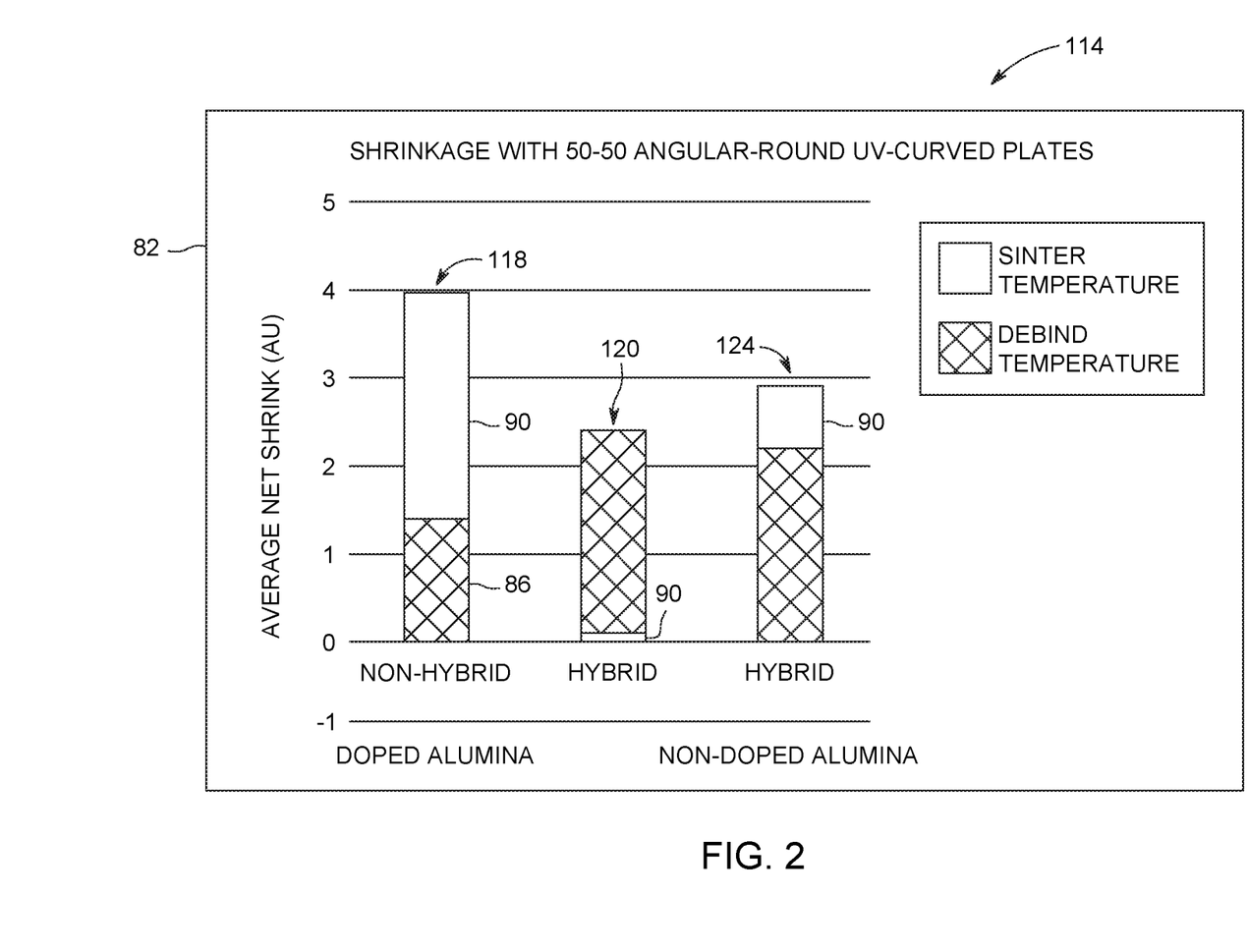
FIG. 2 is a representative bar graph of the average net shrinkage (%) of a ceramic part printed with either a ceramic slurry having either alumina particles with an yttria dopant and an acrylate binder or a ceramic slurry having alumina particles and a hybrid binder, wherein both cases the alumina particles are both mixtures of round and angular particles, in accordance with embodiments of the present approach.

FIG. 2 is a representative bar graph 114 of the average net shrinkage (i.e., debind shrinkage 86 and sintering shrinkage 90) in arbitrary units (AU) for ceramic parts 3D printed using embodiments of the ceramic slurries disclosed herein that include a mixture of more spherical and less spherical ceramic particles. More specifically, bar 118 represents ceramic parts printed with a ceramic slurry having a mixture of comparatively round and comparatively angular doped alumina particles (e.g., yttria-doped) and a non-hybrid binder (e.g., acrylate binder). Bars 120 and 124 represent ceramic parts printed with a ceramic slurry having a mixture of comparatively round and comparatively angular nondoped alumina particles and the hybrid binder. It should be generally noted that the average net shrinkage of the ceramic slurries represented in FIG. 2 are substantially lower (e.g., between approximately 1 and 4 AU lower) than the average net shrinkage values of the ceramic slurries discussed above that do not include the hybrid binder or are doped, demonstrating a substantial reduction in average net shrinkage enabled by the combination of the mixed-morphology ceramic particles with either the hybrid binder or a dopant.

Technical effects of the invention include, among others, a ceramic slurry having a mixture of ceramic particles with different morphologies and particle sizes that may be useful for 3D printing applications. For example, the ceramic slurries disclosed herein include a mixture of ceramic particle morphologies that, in various embodiments, enable a slurry viscosity suitable for 3D printing, enable a substantial reduction in shrinkage and creep within a 3D printed part during debinding and sintering, and enable the ceramic part to have a suitable density and porosity for refractory applications. In certain embodiments, the ceramic particles may be doped (e.g., with yttria) to further decrease debind and sintering shrinkage of the printed ceramic part. In certain embodiments, the ceramic slurry includes a hybrid binder that forms a silicate during debinding to impart handling strength to the brown body ceramic part. Further, embodiments that include the hybrid binder and alumina ceramic particles, the silicate formed further decreases shrinkage of the ceramic part during sintering.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A ceramic slurry for forming a ceramic article, comprising:
    a binder;
    a first plurality of ceramic particles having a first morphology;
    a second plurality of ceramic particles having a second morphology that is different from the first morphology; and
    a photoinitiator;
    wherein the binder comprises an organic resin component and the binder further comprises a siloxane.

2. The ceramic slurry of claim 1, wherein the first plurality of particles has a median sphericity that is greater than a median sphericity of the particles of the second plurality.

3. The ceramic slurry of claim 2, wherein the median sphericity of the particles of the first plurality is at least 0.9.

4. The ceramic slurry of claim 1, wherein total particle loading of the slurry is in a range from about 45 percent to about 75 percent by volume of slurry.

5. The ceramic slurry of claim 1, wherein the first plurality is present in the slurry as from about 20 percent to about 99 percent by volume of total ceramic material present in the slurry.

6. The ceramic slurry of claim 1, wherein the second plurality is present in the slurry as from about 1 percent to about 80 percent by volume of total ceramic material present in the slurry.

7. The ceramic slurry of claim 1, wherein a first median particle size ($d_{50}$) of the first plurality of ceramic particles is different from a second median particle size ($d_{50}$) of the second plurality of ceramic particles, and wherein the first and second $d_{50}$ are between approximately 2 microns (μm) and 25 μm.

8. The ceramic slurry of claim 7, wherein the first median particle size of the first plurality of ceramic particles is in a range from about 8 microns to about 15 microns.

9. The ceramic slurry of claim 7, wherein the second median particle size of the second plurality of ceramic particles is in a range from about 2 microns to about 8 microns.

10. The ceramic slurry of claim 1, wherein the slurry further comprises a dopant.

11. The ceramic slurry of claim 10, wherein the dopant comprises an oxide.

12. The ceramic slurry of claim 11, wherein the oxide comprises yttria, silica, zirconia, titanium oxide, magnesia, cobalt oxide, alumina, zircon, calcium oxide, sodium oxide, erbia or a combination including one or more of these.

13. The ceramic slurry of claim 10, wherein an amount of the dopant is less than approximately 10 volume percent (vol %) of a solids portion of the ceramic slurry.

14. The ceramic slurry of claim 1, wherein the first plurality of ceramic particles comprises silica, zircon, alumina, zirconia, or any combination including one or more of these.

15. The ceramic slurry of claim 1, wherein the second plurality of ceramic particles comprises silica, zircon, alumina, zirconia or any combination including one or more of these.

16. A method for fabricating an article, the method comprising:
    depositing a slurry composition onto a working surface;
    curing at least a portion of the slurry composition to form a green ceramic material;
    debinding the green ceramic material to form a brown ceramic material; and
    sintering the brown ceramic material to form a final ceramic article;
    wherein the slurry comprises:
    a binder;
    a first plurality of ceramic particles having a first morphology;
    a second plurality of ceramic particles having a second morphology that is different from the first morphology; and
    a photoinitiator.

17. The method of claim 16, wherein the first plurality of particles has a median sphericity that is greater than a median sphericity of the particles of the second plurality.

18. The method of claim 17, wherein the median sphericity of the particles of the first plurality is at least 0.9.

19. The method of claim 16, wherein the final ceramic article comprises a porosity in a range from about 25% to about 45%.

20. The method of claim 16, wherein the curing step comprises irradiating the deposited slurry composition with electromagnetic radiation having a suitable wavelength to initiate polymerization of the binder.

21. The method of claim 16, wherein the first plurality is present in the slurry as from about 20 percent to about 99 percent by volume of total ceramic material present in the slurry.

22. The method of claim 16, wherein the slurry further comprises a dopant, the dopant comprising an oxide or a precursor thereof and present in the slurry in an amount less than approximately 10 volume percent (vol %) of a solids portion of the slurry.

* * * * *